A. CLARK.
WINDROW ATTACHMENT FOR BEET HARVESTERS.
APPLICATION FILED MAR. 22, 1910.
971,254.
Patented Sept. 27, 1910.
2 SHEETS—SHEET 1.
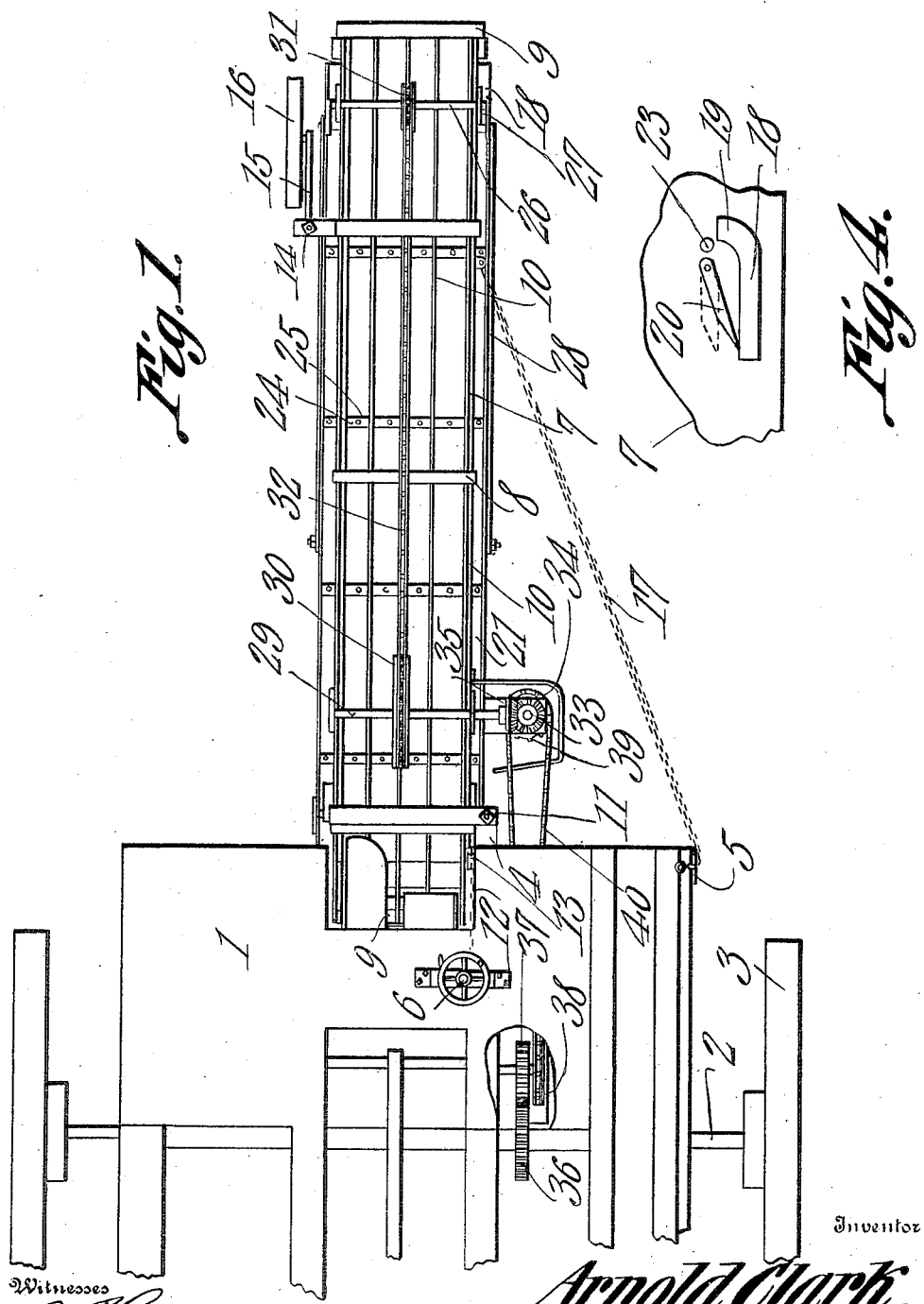
Witnesses
C. P. Linvill
A. Easterday
Inventor
Arnold Clark.
By C. A. Snow & Co.
Attorneys

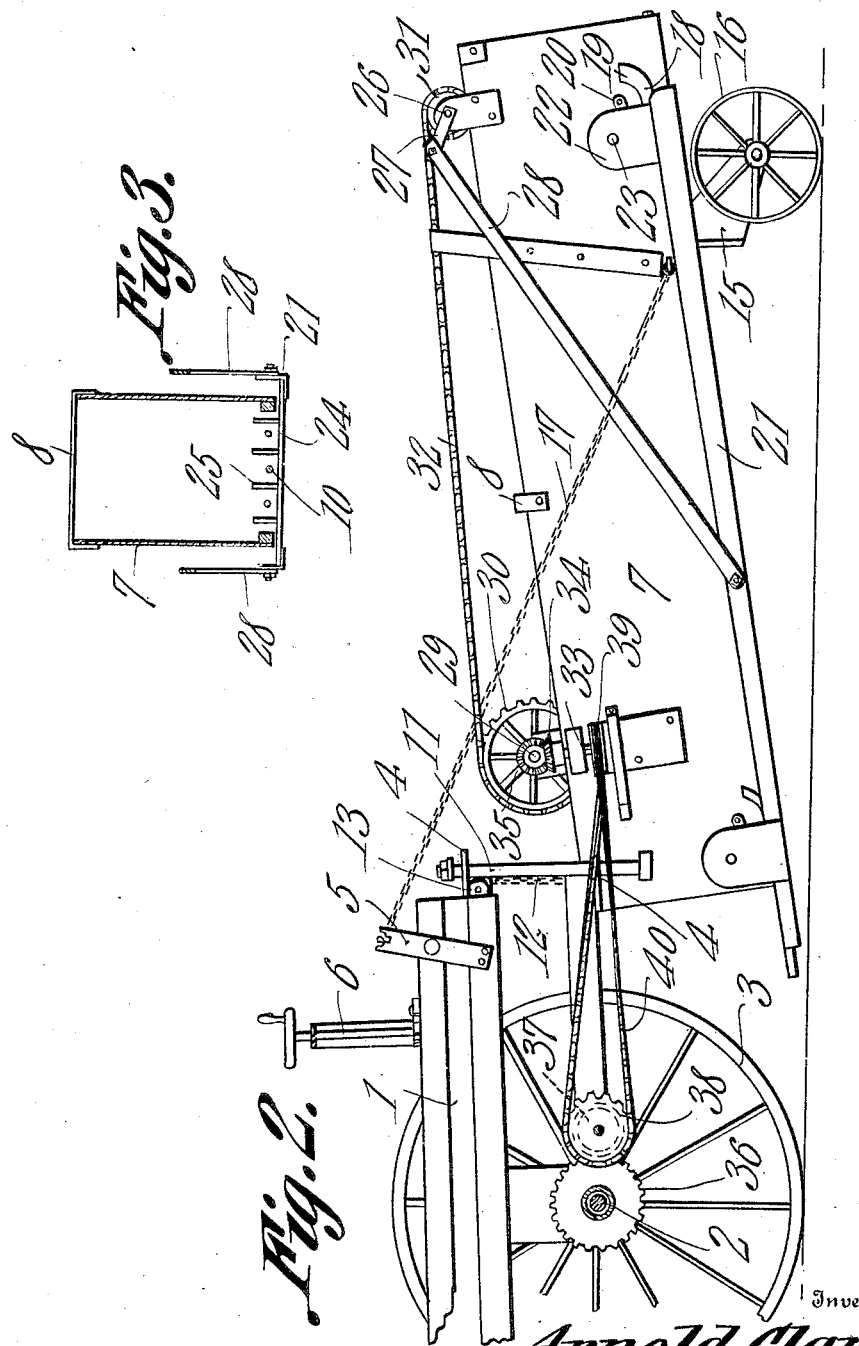

UNITED STATES PATENT OFFICE.

ARNOLD CLARK, OF LATTY, OHIO.

WINDROW ATTACHMENT FOR BEET-HARVESTERS.

971,254. Specification of Letters Patent. Patented Sept. 27, 1910.

Application filed March 22, 1910. Serial No. 550,968.

*To all whom it may concern:*

Be it known that I, ARNOLD CLARK, a citizen of the United States, residing at Latty, in the county of Paulding and State of Ohio, have invented a new and useful Windrow Attachment for Beet-Harvesters, of which the following is a specification.

This invention has relation to windrow attachments for beet harvesters and it consists in the novel construction and arrangement of its parts as hereinafter shown and described.

The object of the invention is to provide an attachment of the character indicated in the form of a trailing frame adapted to be applied to the rear portion of a harvester frame and which is adapted to receive the beets from the harvester and effectually agitate the same to remove the soil therefrom and deposit the beets dug from several rows into a single or windrow in order that they may be conveniently gathered at a subsequent time.

With the above object in view the attachment comprises a frame mounted at its rear portion upon a caster wheel and pivotally connected at its forward end with the harvester frame. Means are provided for swinging the frame of the windrow attachment with relation to the frame of the harvester and securing the frame of the windrow attachment at a desired angle with relation to the harvester frame. An agitator is mounted for movement upon the frame of the attachment and means are provided for operating the said agitator from the supporting wheels of the harvester.

In the accompanying drawings;—Figure 1 is a top plan view of the windrow attachment applied to a harvester frame. Fig. 2 is a side elevation of the same. Fig. 3 is a transverse sectional view of the attachment. Fig. 4 is a detail view of a portion of the attachment.

Inasmuch as the beet harvester forms no part of the present invention only so much of the said harvester is illustrated and will be described as will enable those skilled in the art to understand the operation of the attachment.

In the accompanying drawings 1 indicates the harvester frame which is mounted upon an axle 2 which in turn is supported upon traction wheels 3 in any appropriate manner. Alined guides 4 are located at the rear portion of the frame 1. A cleat 5 is attached to the rear side portion of the frame 1 and a windlass 6 is mounted upon the said frame 1.

The windrow attachment consists of parallel vertically disposed side pieces 7 connected together at their upper edges by cross pieces 8. The lower rear ends of the side pieces 7 are connected together by cross bars 9. Spaced rods 10 are secured at their ends to the cross bars 9 and are in parallel relation with the side pieces 7. A shaft 11 is fixed at its lower end to one of the side pieces 7 of the frame of the windrow attachment and the said shaft 11 is slidably journaled in the guides 4 mounted upon the harvester frame 1. A chain 12 is attached at its lower end to one of the side pieces 7 of the frame of the attachment and the said chain at its intermediate portion passes over a roller 13 journaled for rotation upon the frame 1. The upper end portion of the chain 12 is arranged to wind upon the windlass 6. Thus it will be seen that means are provided for raising and lowering the forward portion of the frame of the windrow attachment. Bearings 14 are mounted upon the outer side of that side piece 7 opposite the side piece 7 to which the shaft 11 is attached and the frame 15 of a caster wheel 16 is pivoted in the bearings 14. The caster wheel 16 supports the rear portion of the frame of the windrow attachment. A bridle chain 17 is secured at its rear end to the side of one of the side pieces 7 and at its forward end is adjustably engaged with the cleat 5 mounted upon the edge portion of the harvester frame 1. Thus it will be seen that by lengthening and shortening the bridle chain 17 the windrow attachment may be swung upon the shaft 11 as an axis so that the said attachment may be positioned at any desired angle with relation to the harvester frame 1.

The side pieces 7 are provided upon their outer surfaces with forwardly and downwardly inclined guides 18 which have upwardly curved rear extremities 19. Pawls 20 are pivoted to the outer surfaces of the side pieces 7 above the guides 18. The said pawls are pivoted at their rear ends and their forward ends are pointed and downwardly inclined and normally lie against the upper edges of the forward portions of the guides 18 in the manner as indicated in solid lines in Fig. 4 of the drawings.

A conveyer is arranged for orbital movement along the lower portions of the side pieces 7 and said conveyer consists of side bars 21 having in the vicinity of their ends upstanding flanges or plates 22. Inwardly disposed pins 23 are carried by the plates 22 and are adapted to move along the guides 18 and over the upper edges of the pawls 20 in a manner as will be explained hereinafter. The side bars 21 are connected together by cross bars 24 which lie transversely under the side pieces of the windrow attachment and the cross bars 24 are provided at intervals with upstanding fingers 25 which are adapted to project upwardly through the spaces between the rods 10 extending longitudinally of the side pieces 7.

A shaft 26 is journaled for rotation at the upper edges of the side pieces 7 and is provided at its ends with cranks 27. Connecting rods 28 operatively connect the free ends of the cranks 27 with the side bars 21.

Means hereinafter to be described are provided for rotating the shaft 26 and as the said shaft rotates the cranks 27 rotate about the axis thereof and the connecting rods 28 are moved longitudinally. Longitudinal movement is thus conveyed to the side bars 21 and as the said bars move toward the rear end of the side pieces 7 the pins 23 carried by the plates 22 ride up over the upper edges of the pawls 20 and the side bars 21 and their attachments are lifted. This projects the fingers 25 up through the spaces between the rods 10 and as the said fingers are moving rearwardly they will engage the material upon the upper sides of the said rods and move the same rearwardly. When the pins 23 arrive at the rear end of the pawls 20 they gravitate down and when they encounter the said rear extremity 19 of the guides 18 they are directed along the forward downwardly inclined edges of the said guides. Thus as the side bars 21 move in a forward direction they are in their lowermost positions and when they move rearwardly they are elevated. This raising and lowering of the side bars 21 moves the fingers 25 correspondingly and therefore as the said fingers move toward the rear of the windrow attachment they are projected up through the spaces between the rods 10 and when the fingers 25 move forwardly they are lowered to such an extent as to fail to operate upon any material resting upon the upper sides of the said rods 10.

A shaft 29 is journaled for rotation above the forward portions of the side pieces 7 and a sprocket wheel 30 is fixed to the said shaft 29. A sprocket wheel 31 is fixed to the shaft 26 and a sprocket chain 32 passes around the sprocket wheels 30 and 31 and is adapted to transmit rotary movement from the shaft 29 to the said shaft 26. A vertically disposed shaft 33 is journaled for rotation beyond the outer side of one of the side pieces 7 and is provided at its upper end with a beveled pinion 34 which meshes with a beveled pinion 35 fixed to the end portion of the shaft 29. A gear wheel 36 is fixed to the axle 2 of the harvester and meshes with a gear wheel 37 journaled for rotation upon the frame of the harvester. A sprocket 38 is arranged for simultaneous rotation with the gear wheel 37 and a sprocket 39 is fixed to the lower portion of the vertically disposed shaft 33. A chain belt 40 passes around the sprocket wheels 38 and 39 and inasmuch as the said sprocket wheel 38 is rotated from the axle 2 of the harvester 1 the chain 40 will transmit rotary movement through the sprocket wheel 39 to the shaft 33 and from the shaft 33 rotary movement is transmitted through the intermeshing beveled pinions 35 and 36 to the shaft 29.

In operation the harvester 1 is passed along a row of beets and the beets are dug and elevated by the harvester in the usual manner and are deposited upon the upper sides of the bars 10 between the side pieces 7 of the windrow attachment. The beets thus deposited are operated upon by the fingers in the manner above indicated and are worked up the rods 10 toward their rear ends and are deposited in a row upon the surface of the soil behind the delivery end of the windrow attachment. Presuming that when the first row of beets is harvested the windrow attachment is in straight alinement with the harvester frame 1 or the line of draft thereof the row of beets will be deposited directly behind the harvester frame 1. After one row of beets has been so placed upon the surface of the ground it is frequently desirable to place several other adjacent rows directly upon the first row of beets so positioned and in order to accomplish this the bridle chain 7 is drawn in and secured in the cleat 5 so that the windrow attachment is adjusted in its angular relation to the frame 1 of the harvester and the succeeding rows of beets after they have been delivered to the windrow attachment are conveyed laterally as they are moved toward the delivery end of the attachment and from the delivery end of the said attachment they may fall upon the row of beets previously deposited upon the ground.

Having described the invention, what I claim as new and desire to secure by Letters Patent is:—

1. In combination with a harvester, a windrow attachment pivotally connected at its forward end with the harvester frame, a wheel supporting the rear portion of the windrow attachment in an inclined position, and means for swinging the attachment laterally and securing the same with respect to the harvester.

2. In combination with a harvester, a windrow attachment pivotally connected at its forward end with the frame of the harvester, means for raising and lowering the forward end of the windrow attachment, a wheel supporting the rear end of the attachment and maintained in an inclined position, and means for swinging the attachment laterally and securing the same at an angle with respect to the harvester frame.

3. In combination with a harvester, a windrow attachment comprising a frame pivotally connected with the harvester, said attachment having spaced bars, side bars mounted for orbital movement adjacent the sides of the attachment, cross bars carried by the side bars, fingers mounted upon the cross bars and adapted to project through the intervals between the spaced bars, and means for operating the side bars from the harvester.

4. In combination with a harvester, a windrow attachment comprising a frame attached to the harvester, spaced bars extending longitudinally of the attached frame, side bars movably mounted adjacent the sides of the attached frame, guides located upon said frame, pawls pivotally mounted above said guides, pins carried by the side bars and adapted to operate along the guides and over the pawls, and means for moving the side bars from the harvester.

5. In combination with a harvester, a windrow attachment comprising a frame connected at its forward end with the harvester, spaced bars located in the attached frame, side bars movably mounted at the sides of the attached frame, guides located upon the attached frame, pawls located upon the attached frame above said guides, inwardly disposed pins carried by the side bars and adapted to operate over the guides and the said pawls, a shaft journaled for rotation upon the attached frame and having crank extremities, connecting rods pivoted at their ends to the cranks of said shaft and the said side bars, and means for rotating said shaft from the harvester.

6. In combination with a harvester, a windrow attachment comprising a frame pivotally attached at the forward end of one of its sides with the harvester, a caster wheel pivoted at the rear portion of the other side of said attached frame, means for swinging said attached frame and securing the same with respect to the harvester frame, spaced bars carried by the attached frame and a conveyer arranged to coöperate with said spaced bars, and means operatively connecting the conveyer with the harvester.

In testimony that I claim the foregoing as my own, I have hereto affixed my signature in the presence of two witnesses.

ARNOLD $\overset{\text{his}}{\times}$ CLARK.
        mark.

Witnesses:
 J. Long,
 E. P. Shaeffer.